3,157,630
COPPER-CONTAINING MONOAZO DYESTUFFS HAVING A CYANURIC HALIDE RADICAL
William Elliot Stephen, Colin George Tilley, and Cyril Eric Vellins, Manchester, England, assignors to Imperial Chemical Industries Limited, London, England, a corporation of Great Britain
No Drawing. Filed June 18, 1958, Ser. No. 742,718
Claims priority, application Great Britain July 5, 1957
1 Claim. (Cl. 260—146)

This invention relates to new copper-containing monoazo dyestuffs and more particularly it relates to copper-containing monoazo dyestuffs obtained from cyanuric halides.

According to the invention there are provided the copper-containing monoazo dyestuffs which correspond in their copper-free state to the formula:

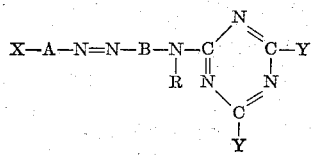

Formula 1 wherein A stands for an aryl nucleus,

X stands in ortho position to the azo group and represents a substituent capable of metal complex formation, B stands for a naphthalene nucleus containing at least 2 sulphonic acid groups and a hydroxyl group in ortho position to the azo group, R stands for a hydrogen atom or an alkyl group, and Y stands for a halogen atom, wherein the grouping —NR— is attached directly to the naphthalene nulceus or is attached to an acylamino grouping which is attached to the naphthalene nucleus.

The aryl nucleus represented by A in the above formula may be, for example, a benzene nucleus or a naphthalene nucleus, and it may be further substituted for example by halogen such as chlorine, by alkyl such as methyl, by alkoxy such as methoxy, and ethoxy, by alkyl sulphonyl, acyl such as acetyl or benzoyl, acylamino, nitro, sulphonic acid and carbamyl and sulphamyl which may be substituted.

X in the above formula may represent, for example, a hydroxy, methoxy, carboxy or carboxymethoxy group.

The alkyl group represented by R is preferably one containing 4 or less carbon atoms.

The new copper containing monoazo dyestuffs contain one atom of copper for each molecule of the azo compound of Formula 1, and preferably at least 3 sulphonic acid groups.

The new copper containing monoazo dyestuffs may be obtained by reacting together at least one molecular proportion of a cyanuric halide with one molecular proportion of one of the copper containing azo compounds which correspond in their metal free state to the formula:

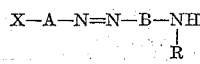

Formula 2 wherein X, A, B and R have the meanings stated above, and the grouping NHR is attached directly to the naphthalene nucleus or is attached to an acylamino grouping which is attached to the naphthalene nucleus. This process constitutes a further feature of the invention.

The compounds of Formula 2 may be obtained by coupling one molecular proportion of the diazo compound of an aminoaryl compound which bears, in ortho position to the amino group, a substituent which is capable of metal-complex formation, with one molecular proportion of a naphthol which contains at least two sulphonic acid groups and which also contains an amino, alkylamino, or aminoacylamino group.

The compounds so formed are then treated with a copper-yielding agent in order to obtain the copper-containing azo compounds used in the process of the invention.

The coupling is preferably carried out in alkaline medium. Suitable naphthols include, for example, 1-amino-8-naphthol-3:6-disulphonic acid, 1-amino-8-naphthol-4:6-disulphonic acid, 1-ethylamino - 8 - naphthol - 4:6 - disulphonic acid, 1 - ethylamino-8-naphthol-3:6-disulphonic acid, 1-n-butylamino-8-naphthol - 3:6 - disulphonic acid, 2-amino-5-naphthol-1:7-disulphonic acid, 1-(3'-aminobenzoyl)amino - 8 - naphthol - 3:6 - disulphonic acid and 1-(4'-aminobenzoyl)amino - 8 - naphthol-3:6-disulphonic acid.

The preferred aminoaryl compounds for use as diazo components are those of the benzene or naphthalene series, especially valuable dyestuffs being obtained when the diazo component used to obtain the compound of Formula 2 is a 2-aminophenol containing a sulphonic acid or a lower alkyl sulphonyl grouping.

Suitable aminoaryl compounds include, for example, 2-aminophenol, 2-aminophenol-4-sulphonic acid, 4-ethane sulphonyl-2-aminophenol, 3-amino-4-hydroxy acetophenone, 4-nitro-2-aminophenol-6-sulphonic acid, 6-nitro-2-aminophenol-4-sulphonic acid, 4-chloro-2-aminophenol-6-sulphonic acid, 6 - chloro - 2 - aminophenol-4-sulphonic acid, 4- and 5-nitro-2-aminophenols, 4-chloro-2-aminophenol, 2-aminophenol-4-sulphonamide, 2-aminophenol-4-sulphonmethylamide, anthranilic acid, 4- and 5-sulpho-2-aminobenzoic acids, 5-nitro-2-aminophenoxyacetic acid, o - anisidine, 4 - chloro - 2 - aminoanisole, 2-aminoanisole-4-sulphonic acid, 1-amino-2-naphthol-4-sulphonic acid, 1-amino-6-nitro-2-naphthol-4-sulphonic acid, amino-terephthalic acid and 2-amino-isophthalic acid.

To convert the copper-free compounds of Formula 2 to their complex copper compounds, the copper-free compounds are treated with a copper-yielding agent such as copper sulphate or cuprammonium sulphate the latter being particularly useful when a de-alkylative coppering is required, by methods well-known in themselves, for example by heating the copper-free compound with an aqueous solution of the copper-yielding agent.

The process of the invention is preferably carried out at below 5° C. The preferred reaction medium is water, although it may also contain water-soluble organic solvents such as acetone or dioxan. It is desirable to add an acid-binding agent, preferably sodium carbonate or sodium bicarbonate to keep, so far as be possible, the medium at a pH between 6 and 7 during the reaction period.

The new dyestuffs may be isolated by customary techniques for the isolation of water-soluble dyestuffs, usually by precipitating the dystuff in the form of its sodium salt by adding sodium chloride to the reaction medium and filtering off and drying the resultant precipitate.

In order to lessen the removal, by hydrolysis, of the halogen atoms attached to the triazine nuclei of the new dyestuffs it is preferred to adjust the pH of the reaction medium to about 6.5 at the end of the reaction period and before isolating the new dyestuff. It has also been found advantageous to add certain buffers which dissolve in water to give an aqueous solution of pH between 5 and 8 at this point in the manufacturing process. Suitable buffers are mixtures of water-soluble salts of phosphoric acid, or of dialkylaminoaryl sulphonic acids, in which the alkyl groups contain at least 2 carbon atoms, and their alkali metal salts, which give an aqueous solution of pH about 6.5. These buffers may also be added with advantage to the dried dyestuff powder since the stability of the dyestuff in the powder is greatly enhanced thereby.

The new dyestuffs of the invention, in the form of their alkali-metal salts, are readily soluble in water. They are especially useful for the colouration of cellulosic textile materials in conjunction with a treatment with an acid-binding agent, for example by the process described in Belgian specification No. 543,218, wherein the coloured textile material is after-treated with an acid-binding agent, or by related processes wherein an acid-binding agent is applied to the textile material before or during the treatment with the dyestuff.

When so applied the new copper-containing monoazo dyestuffs give red, reddish-blue, purple and violet shades having good light fastness and very good fastness to wet treatments, especially to severe washing treatments. Those of the new dyestuffs which have 3 sulphonic acid groups and in which the triazinylamino group is attached to a beta-position of the naphthalene nucleus give bluish-red shades having exceptionally good resistance to treatments with hypochlorite bleach. Those which contain 3 sulphonic acid groups and in which the triazinylamino groups is attached to an alpha-position of the naphthalene nucleus give much bluer shades, approximating to a violet, also having excellent resistance to hypochlorite bleach.

The shades also have very good resistance to fading caused by exposure to the combustion products of coal gas.

The invention is illustrated but not limited by the following examples in which parts and percentages are by weight:

*Example 1*

2-aminophenol-4-sulphonic acid is diazotised and coupled with an alkaline solution of 1-amino-8-naphthol-3:6-disulphonic acid, and the aminoazo compound obtained is converted to the copper complex by boiling with an aqueous solution of copper sulphate containing a little acetic acid.

Sufficient of the copper complex so obtained to contain 59.95 parts of the aminoazo compound is dissolved in water and the solution is added to a suspension of 18.4 parts of cyanuric chloride in ice-cold water. The mixture is stirred for 2 hours at from 0 to 5° C., sodium carbonate being added at intervals to neutralise the mixture to litmus.

Sodium chloride is then added at the rate of 100 parts for each 1000 parts of reaction mixture and the product which separates is filtered off and dried. It contains 1.96 atoms of organically bound chlorine for each azo group and consists substantially of the dichlorotriazinyl derivative of the copper-containing aminoazo compound used as starting material.

The dyestuff is mixed with 1/10 its weight of a 1:1.8 mixture of disodium hydrogen phosphate and potassium dihydrogen phosphate. The product so obtained colours cellulosic fibres in reddish violet shades when applied by the methods described above. Three suitable colouring recipes which may be used are as follows:

(1) 100 parts of cotton fabric are padded in a 2% aqueous solution of the dyestuff and squeezed until the weight of the fabric is 200 parts. The fabric is dried, padded in an aqueous solution containing 1% of caustic soda and 30% of sodium chloride, and again squeezed until its weight is 200 parts.

The fabric is then steamed for 1 minute at 100° C. then rinsed in water, boiled in a dilute soap solution for five minutes, rinsed again in water and dried. It is dyed a level reddish violet shade having very good fastness to washing and to light.

(2) A printing paste is made by mixing together 2 parts of the dyestuff, 5 parts of urea, 40 parts of a 5% aqueous solution of sodium alginate, 52 parts of water and 1 part of sodium bicarbonate.

The printing paste is applied to cotton fabric by roller and the treated fabric is dried and then steamed for 5 minutes. The fabric is then rinsed in water, boiled in a dilute soap solution for five minutes, rinsed again in water and dried. The fabric is locally coloured a reddish violet shade where the printing paste was applied. The shade is very fast to light and to washing, there being very little staining of the adjacent white portions of the fabric when the printed fabric is subjected to severe washing tests.

(3) 2 parts of the dyestuff are dissolved in 3000 parts of water at 20° C. 100 parts of viscose rayon yarn are added to the solution and then 90 parts of sodium chloride are added. The yarn is agitated in the solution for 30 minutes and then 6 parts of soda ash are added. After one hour further, the yarn is removed, rinsed in water, scoured for 15 minutes in a boiling 0.3% aqueous solution of detergent, then rinsed again in water and dried.

In the following table, there are set forth additional examples of the invention which are obtained in the manner described in Example 1 above but starting from the diazo and coupling components listed in the first and second columns of the table. The final column shows the shades of the new copper-containing monoazo dyestuff obtained when they are used to colour cellulosic fabrics by the recipes described in Example 1.

| Diazo Component | Coupling Component | Shade |
|---|---|---|
| (2) 2-aminophenol-4-sulphonmethylamide. | 1-amino-8-naphthol-3:6-disulphonic acid. | Bluish violet. |
| (3) 4-ethane sulphonyl-2-aminophenol. | -----do----- | Do. |
| (4) 4-nitro-2-aminophenol-6-sulphonic acid. | -----do----- | Reddish blue. |
| (5) 6-nitro-2-aminophenol-4-sulphonic acid. | -----do----- | Reddish violet. |
| (6) 4-chloro-2-aminophenol-6-sulphonic acid. | -----do----- | Violet. |
| (7) 6-chloro-2-aminophenol-4-sulphonic acid. | -----do----- | Do. |
| (8) anthranilic acid. | -----do----- | Bluish red. |
| (9) 4-nitro-2-aminophenol. | -----do----- | Dull reddish blue. |
| (10) 2-aminophenol. | -----do----- | Reddish violet. |
| (11) 5-sulpho-2-amino benzoic acid. | -----do----- | Reddish blue. |
| (12) anthranilic acid. | 1-amino-8-naphthol-4:6-disulphonic acid. | Bright bluish red. |
| (13) 5-nitro-2-aminophenol. | -----do----- | Bluish grey. |
| (14) 4-nitro-2-aminophenol. | -----do----- | Reddish violet. |
| (15) 4-chloro-2-aminophenol. | -----do----- | Violet. |
| (16) 2-aminophenol-4-sulphonamide. | -----do----- | Reddish violet. |
| (17) 2-aminophenol-4-sulphonic acid. | -----do----- | Do. |
| (18) 4-ethanesulphenyl-2-aminophenol. | -----do----- | Do. |
| (19) 4-nitro-2-aminophenol-6-sulphonic acid. | -----do----- | Violet. |
| (20) 6-nitro-2-aminophenol-4-sulphonic acid. | -----do----- | Reddish violet. |
| (21) 4-chloro-2-aminophenol-6-sulphonic acid. | -----do----- | Violet. |
| (22) 6-chloro-2-aminophenol-4-sulphonic acid. | -----do----- | Do. |
| (23) 2-aminophenol-4-sulphonic acid. | 2-amino-5-naphthol-1:7-disulphonic acid. | Bluish red. |
| (24) 2-aminophenol-4-sulphonamide. | -----do----- | Do. |

| Diazo Component | Coupling Component | Shade |
|---|---|---|
| (25) 4-nitro-2-aminophenol | 1-ethylamino-8-naphthol-3:6-disulphonic acid. | Violet. |
| (26) 2-aminophenol-4-sulphonic acid. | 1-(3'-aminobenzoyl)amino-8-naphthol-3:6-disulphonic acid. | Do. |
| (27) 4-nitro-2-aminophenol | 1-butylamino-8-naphthol-3:6-disulphonic acid. | Do. |
| (28) 4-nitro-2-aminobenzoic acid. | 1-amino-8-naphthol-3:6-disulphonic acid. | Do. |
| (29) 2-amino-terephthalic acid. | ----do---- | Do. |
| (30) 4-methoxy-2-aminophenol. | ----do---- | Bluish violet. |
| (31) 2-methoxy-1-amino-naphthalene-6-sulphonic acid. | 1-butylamino-8-naphthol-3:6-disulphonic acid. | Purple. |
| (32) 6-chloro-2-aminophenol-4-sulphonic acid. | ----do---- | Violet. |
| (33) 1-amino-6-nitro-2-naphthol-4-sulphonic acid. | 1-amino-8-naphthol-4:6-disulphonic acid. | Dull reddish blue. |
| (34) 4-sulpho-2-aminobenzoic acid. | 2-amino-5-naphthol-1:7-disulphonic acid. | Orange brown. |
| (35) anthranilic acid | ----do---- | Do. |
| (36) 6-chloro-2-aminophenol-4-sulphonic acid. | 2-amino-8-naphthol-3:6-disulphonic acid. | Reddish violet |

What we claim is:
The copper complex of the dyestuff of the formula:

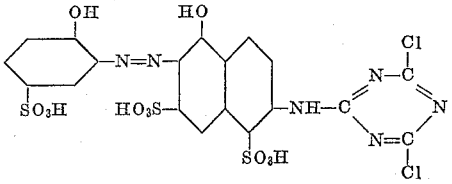

References Cited in the file of this patent
UNITED STATES PATENTS

| | | |
|---|---|---|
| 1,667,312 | Fritzsche et al. | Apr. 24, 1928 |
| 1,779,298 | Straub et al. | Oct. 21, 1930 |
| 2,653,149 | Riat | Sept. 22, 1953 |
| 2,763,640 | Riat et al. | Sept. 18, 1956 |
| 2,835,663 | Benz | May 20, 1958 |
| 2,892,829 | Stephen | June 30, 1959 |

FOREIGN PATENTS

| | | |
|---|---|---|
| 1,139,795 | France | Feb. 18, 1957 |
| 1,139,796 | France | Feb. 18, 1957 |
| 502,939 | Italy | Dec. 2, 1954 |
| 545,035 | Italy | June 22, 1956 |